United States Patent [19]
Spadafora

[11] Patent Number: 5,967,589
[45] Date of Patent: Oct. 19, 1999

[54] SUN VISOR RETENTION CLIP

[75] Inventor: Paul Anthony Spadafora, Rochester Hills, Mich.

[73] Assignee: General Motors Corporation, Detroit, Mich.

[21] Appl. No.: 09/024,730

[22] Filed: Feb. 17, 1998

[51] Int. Cl.[6] ....................................................... B60J 3/00
[52] U.S. Cl. ............................ 296/97.9; 24/295; 24/607; 248/222.12
[58] Field of Search ..................... 296/97.9; 24/293–295, 24/297, 607; 248/222.12

[56] References Cited

U.S. PATENT DOCUMENTS

| | | | |
|---|---|---|---|
| 4,893,866 | 1/1990 | Dowd et al. | 296/214 |
| 4,902,068 | 2/1990 | Dowd et al. | 296/214 |
| 4,913,484 | 4/1990 | Dowd et al. | 296/97.12 |
| 4,989,911 | 2/1991 | Van Order | 296/97.9 |
| 5,061,005 | 10/1991 | Van Order et al. | 296/979 |
| 5,082,323 | 1/1992 | Dowd et al. | 296/214 |
| 5,201,564 | 4/1993 | Price | 296/97.9 |
| 5,236,240 | 8/1993 | Burns et al. | 296/97.9 |
| 5,269,060 | 12/1993 | Dowd et al. | 29/897.2 |
| 5,417,466 | 5/1995 | Giantonio et al. | 296/97.9 |
| 5,484,186 | 1/1996 | Van Order et al. | 296/97.5 |
| 5,499,854 | 3/1996 | Crotty, III et al. | 296/97.13 |
| 5,560,575 | 10/1996 | Krysiak | 248/222.12 |
| 5,567,098 | 10/1996 | Gordon | 411/48 |
| 5,632,061 | 5/1997 | Smith et al. | 16/110 R |

*Primary Examiner*—Dennis H. Pedder
*Attorney, Agent, or Firm*—Charles E. Leahy

[57] ABSTRACT

According to the invention, an aperture is provided in the roof panel including a central opening and a plurality of slot portions radiating outwardly from the central opening and each such slot portion being defined by spaced apart side walls an end wall. The headliner has upper and lower surfaces and an aperture adapted to register with the roof panel aperture. A retention clip of stamped spring steel engages with the upper surface of the headliner and has a central body either a central aperture registering with the headliner. The sun visor has a mounting bracket which engages with the lower surface of the headliner. Screws are installed through the mounting bracket and into the retention clip so that the headliner is captured between the mounting bracket and the retention clip. The retention clip has a plurality of spring legs which radiate from the central body and are bent to project upwardly from the central body and have ends bent backwardly and terminating in a shoulder structure. Upon insertion of the retention clip into the roof panel aperture, the shoulder structure engages with the end walls of the slot portions of the roof panel aperture so that the sun visor and headliner are thereby snap mounted to the roof panel.

2 Claims, 2 Drawing Sheets

SUN VISOR RETENTION CLIP

TECHNICAL FIELD

The invention relates to a retention clip for snap mounting a sun visor and headliner into an apertured roof panel of a motor vehicle.

BACKGROUND OF THE INVENTION

It is well known that a motor vehicle body roof construction includes a welded together sheet metal roof which is concealed from view of the vehicle occupant by a headliner panel. The headliner panel is typically of laminated paper, foam, and/or plastic construction and covered with a fabric which matches the interior trim of the vehicle body.

It is also well known to install a sun visor onto the vehicle roof adjacent the windshield. The sun visor typically includes a mounting bracket which is suitably attached to the roof panel.

Prior patents have proposed various snap-in mounting clips for attaching the sun visor to the roof panel. The present invention provides a new and improved snap-in sun visor retention clip of economical manufacture and improved retention performance.

SUMMARY OF THE INVENTION

According to the invention, an aperture is provided in the roof panel including a central opening and a plurality of slot portions radiating outwardly from the central opening and each such slot portion being defined by spaced apart side walls an end wall. The headliner has upper and lower surfaces and an aperture adapted to register with the roof panel aperture. A retention clip of stamped spring steel engages with the upper surface of the headliner. The sun visor has a mounting bracket which engages with the lower surface of the headliner. Screws are installed through the mounting bracket and into the retention clip so that the headliner is captured between the mounting bracket and the retention clip. The retention clip has a plurality of spring legs which radiate from the central body and are bent to project upwardly from the central body and have ends bent backwardly and terminating in a shoulder structure. Upon insertion of the retention clip into the roof panel aperture, the shoulder structure engages with the end walls of the slot portions of the roof panel aperture so that the sun visor and headliner are thereby snap mounted to the roof panel.

BRIEF DESCRIPTION OF THE DRAWINGS

These and other objects, features and advantages of the invention will become apparent in consideration of the Description of the Preferred Embodiments and the appended drawings in which.

DESCRIPTION OF THE PREFERRED EMBODIMENTS

Figure 1:
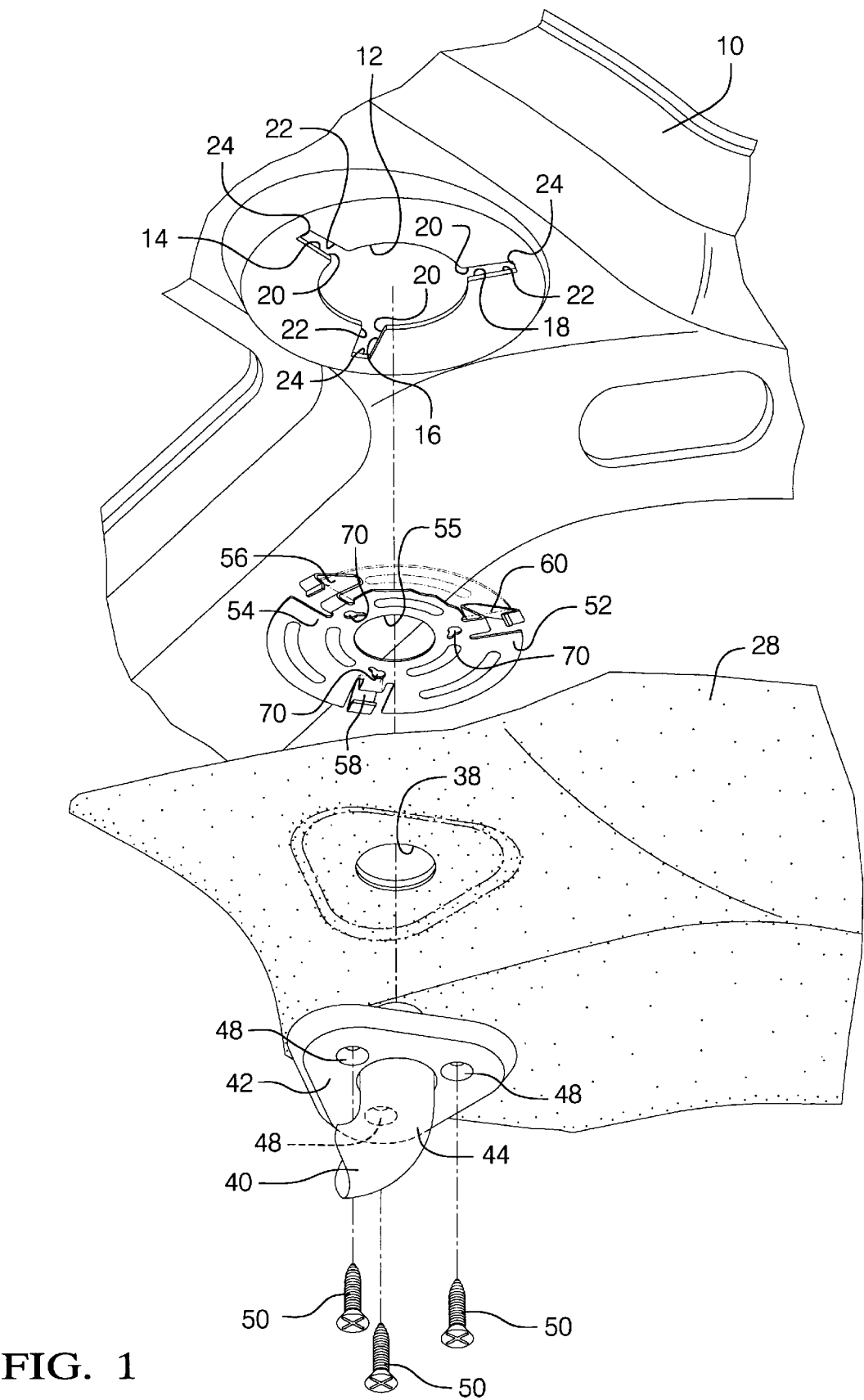
FIG. 1 is an exploded perspective view of the mounting system of this invention.

Referring to FIG. 1, it is seen that a vehicle roof panel 10 of a motor vehicle body includes an aperture 12 having a plurality of slot portions 14, 16 and 18 which radiate outwardly therefrom and each of these slot portions includes laterally spaced side walls 20 and 22 and end walls 24.

Figure 3:
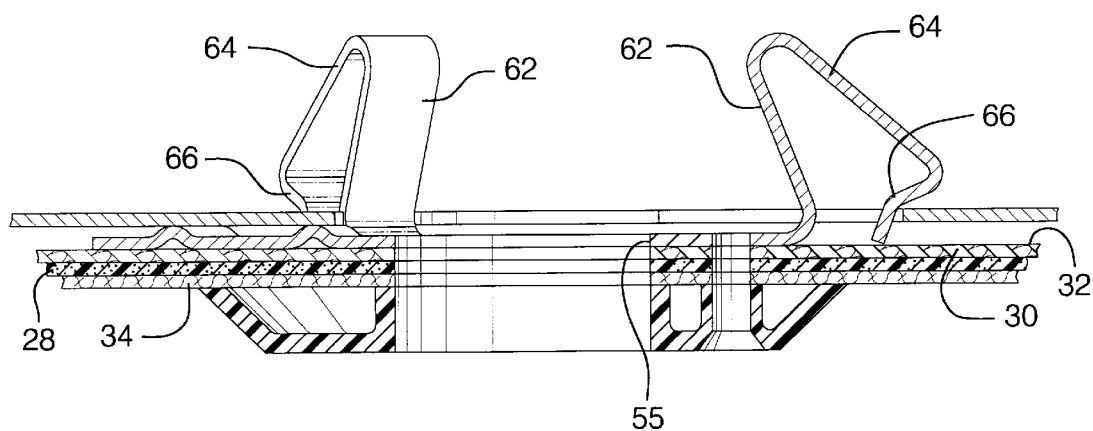
FIG. 3 is a section view taken in the direction of arrows 3—3 of FIG. 2.

A headliner panel 28 is provided for attachment onto the underside of the roof panel 10 to thereby conceal the roof panel 10 from view of the vehicle occupant. As best seen in FIG. 3, the headliner panel 28 is of conventional laminated construction including cardboard and foam layers 30 and 32 and a decorative fabric 34. The headliner panel 28 has an aperture 38 which aligns with the aperture 12 of the roof panel 10.

A sun visor assembly 40 includes a mounting bracket 42 which receives a sun visor pivot rod 44. The pivot rod 44 is captured within the mounting bracket 42 by a conventional swivel and spring assembly so that the rod 40 may rotate about the mounting bracket 42. The mounting bracket 42 includes holes 48 for receiving screws 50.

Figure 2:
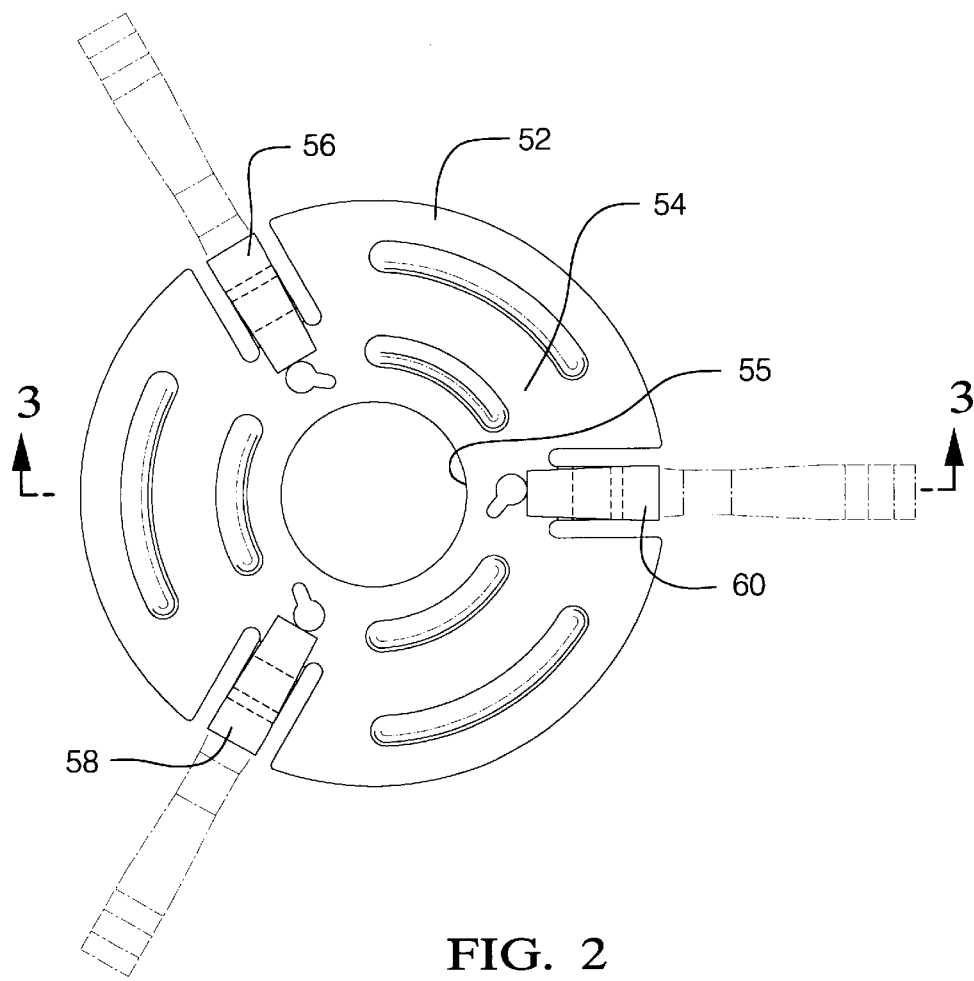
FIG. 2 is a plan view of the retention clip of this invention.

A retention clip 52 as seen in FIGS. 1, 2 and 3, is stamped of spring steel and includes a central body 54 having a central clearance opening 55 which registers with the aperture 38 of the headliner panel 28 and aperture 12 of the roof panel 10. The retention clip 52 has a plurality of spring legs 56, 58 and 60 which radiate outwardly from the central body 54 as shown in phantom line in FIG. 2. Each of the spring legs includes an upwardly bent upright portion 62 and a downwardly bent wing 64 which terminates in a retention shoulder portion 66.

Referring to FIGS. 1 and 3, it will be understood that the sun visor 40 and the retention clip 52 are assembled with the headliner panel 28 by sandwiching the headliner panel 28 between the sun visor mounting bracket 42 and the retention clip 52 and then installing the plurality of screws 50. These screws 50 self-thread themselves through the headliner panel 28 and then enter screw holes 70 provided in the retention clip 52.

The headliner panel 28 is then installed into the vehicle by raising the headliner panel 28 against the roof panel 10 so that the retention clip 52 becomes inserted into the aperture 12 of the roof panel 10. In particular, as best seen in FIG. 3, the legs 56, 58 and 60 of the retention clip 52 are respectively received within the slot portions 14, 16 and 18 of the roof panel aperture 12. During such insertion, the wing portions 64 of the retention clip legs bear against the underside of the roof panel 12 to thereby deflect the retention clips. When the retention clip legs reach the fully installed position of FIG. 3, the bent wing portions 64 are flexed outwardly so that the retention shoulder portions 66 of the legs become engaged with the upper side of the roof panel 10 to thereby snap retain the headliner and sun visor into the assembled position attached to the vehicle body.

It will be understood and appreciated that the snap engagement of the retention shoulder portions 66 with the roof panel occur at the end walls 24 of the slot portions of the roof aperture 12. This occurrence of the snap retention at the radially outermost margin of the roof panel opening 12 helps to stabilize the retention clip 52 and the mounting bracket 42 of the sun visor against rocking motion with respect to the roof panel, thereby providing an efficient and stable snap mounting retention to the sun visor to the roof panel.

Thus, it is seen that the invention provides a new and improved mounting system for snap retaining a sun visor and headliner on a vehicle roof.

I claim:

1. A mounting system for snap mounting of a sun visor and headliner into the roof panel of the vehicle comprising:

an aperture in the roof panel including a central opening and a plurality of slot portions radiating outwardly from the central opening and each such slot portion defined by spaced apart side walls and an end wall;

the headliner being a panel having upper and lower surfaces and an aperture adapted to register with the aperture of the roof panel;

a retention clip stamped of spring steel and having a central body with a central aperture adapted to register with the apertures of the roof panel and headliner, and having a plurality of spring legs radiating from the central body and bent to project upwardly from the central body and having ends bent backwardly and terminating in a shoulder structure adapted for engagement with the end walls of the slot portions of the roof panel aperture upon insertion of the spring legs of the retention clip through the aperture of the roof panel.

2. A mounting system for snap mounting of a sun visor and headliner into the roof panel of the vehicle comprising:

an aperture in the roof panel including a central opening and a plurality of slot portions radiating outwardly from the central opening and each such slot portion defined by spaced apart side walls and an end wall;

the headliner being a panel and having upper and lower surfaces and an aperture adapted to register with the aperture of the roof panel;

a retention clip stamped of spring steel adapted to engage with the upper surface of the headliner and having a central body with a central aperture adapted to register with the apertures of the roof panel and headliner;

said sun visor having a mounting bracket adapted to engage with the lower surface of the headliner and associated fasteners for attaching the mounting bracket to the retention clip to thereby capture the headliner therebetween;

and said retention clip having a plurality of spring legs radiating from the central body and bent to project upwardly from the central body and having ends bent backwardly and terminating in a shoulder structure adapted for engagement with the end wall of the slot portions of the roof panel aperture upon insertion of the spring legs of the retention clip through the aperture of the roof panel whereby the sun visor and headliner are snap mounted to the roof panel.

* * * * *